United States Patent
Barghi et al.

(10) Patent No.: US 8,582,526 B2
(45) Date of Patent: Nov. 12, 2013

(54) METHOD AND APPARATUS FOR THE USE OF MULTIPLE-INPUT, MULTIPLE OUTPUT (MIMO) SYSTEMS FOR MULTI-PACKET RECEPTION (MPR)

(75) Inventors: Sanaz Barghi, Irvine, CA (US); Hamid Jafarkhani, Irvine, CA (US); Homayoun Yousefi'zadeh, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 275 days.

(21) Appl. No.: 13/091,075

(22) Filed: Apr. 20, 2011

(65) Prior Publication Data

US 2011/0261709 A1   Oct. 27, 2011

Related U.S. Application Data

(60) Provisional application No. 61/327,063, filed on Apr. 22, 2010.

(51) Int. Cl.
*H04W 4/00* (2009.01)
*H04W 72/04* (2009.01)
*H04W 88/08* (2009.01)

(52) U.S. Cl.
CPC .......... *H04W 72/0446* (2013.01); *H04W 88/08* (2013.01)
USPC .......................................................... 370/330

(58) Field of Classification Search
USPC ............ 370/329, 337, 330; 451/561; 375/267
See application file for complete search history.

(56) References Cited

U.S. PATENT DOCUMENTS

| | | | |
|---|---|---|---|
| 2005/0281350 A1* | 12/2005 | Chae et al. ..................... | 375/267 |
| 2009/0034643 A1* | 2/2009 | Ahn et al. ....................... | 375/267 |
| 2009/0129497 A1* | 5/2009 | Stopler et al. ................. | 375/267 |
| 2009/0316828 A1* | 12/2009 | Qu ................................ | 375/298 |
| 2011/0002408 A1* | 1/2011 | Javaudin ....................... | 375/261 |

* cited by examiner

*Primary Examiner* — Pao Sinkantarakorn
*Assistant Examiner* — Richard K Chang
(74) *Attorney, Agent, or Firm* — Marcus C. Dawes; Daniel L. Dawes (57) ABSTRACT

A method for multipacket communication in an asynchronous wireless system includes the steps of transmitting at least two packets of 2M digital signals from a plurality of transmitters without other transmission taking place within a predetermined number of symbol durations from each side of each packet. Each transmitter generates digital signals denoted as at least two super-symbols according to an Alamouti coding scheme corresponding to M symbols of first set of super-symbols in a first transmission interval and a second set of super-symbols in a second transmission interval. The received packets include inter-symbol interference of the super-symbols when imperfectly synchronized which expands the time interval of the received packets. A symmetric Alamouti structure for the received packets is generated by folding the expanded received signal on itself, multiplying by a factor of −1, and decoding using the Alamouti structure for the received packets at each antenna of the receiver.

14 Claims, 6 Drawing Sheets

COLLISIONS → SUCCESSFUL RECEPTIONS

PACKET 2     COLLISION     PACKET 1

WHAT IF WE CAN TRANSFORM COLLISIONS INTO EFFICIENT USE OF THE CHANNEL?

MULTIPLE-PACKET RECEPTION IS A SOLUTION

PACKET 2     PACKET 1 / PACKET 2     PACKET 1

METHOD AND APPARATUS FOR THE USE OF MULTIPLE-INPUT, MULTIPLE OUTPUT (MIMO) SYSTEMS FOR MULTI-PACKET RECEPTION (MPR)

RELATED APPLICATIONS

The present application is related to U.S. Provisional Patent Application, Ser. No. 61/327,063, filed on Apr. 22, 2010, which is incorporated herein by reference and to which priority is claimed pursuant to 35 USC 119.

BACKGROUND OF THE INVENTION

1. Field of the Invention

The invention relates to the field of multiple-input, mutliple output (MIMO) systems for multi-packet reception (MPR) in which collisions are resolved in physical layer using Alamouti coding.

2. Description of the Prior Art

The use of multiple-packet reception (MPR) in wireless networks is known to improve throughput especially in high traffic conditions. The lack of synchronization among the nodes in random access systems introduces significant challenges with respect to the adoption of MPR in the physical layer (PHY) of the open systems interconnection (OSI) model and the link layer or media access control (MAC) design for systems using MPR. An instantiation of PHY connects a link layer device to a physical medium such as an optical fiber or copper cable. For example, in a wireless network the PHY portion consists of the RF, mixed-signal and analog portions, that are often called transceivers, and the digital baseband portion that place high demand on the digital signal processing (DSP) and communication algorithm processing, including channel codes. It is common that these PHY portions are integrated with the media access control (MAC) layer in system-on-a-chip (SOC) implementations.

Layered OSI architecture is the de facto standard of operation in wired networks, namely a seven layer design comprised of the physical layer (PHY), data link layer, network layer, transport layer, session layer, presentation layer and application layer. The data link layer is comprised of two sublayers, namely the logical link control sublayer (LLC) and the media access control sublayer (MAC). LLC multiplexes protocols running atop the data link layer, and optionally provides flow control, acknowledgment, and error notification. The LLC provides addressing and control of the data link. It specifies which mechanisms are to be used for addressing stations over the transmission medium and for controlling the data exchanged between the originator and recipient machines. The MAC sublayer is below the LLC sublayer and determines who is allowed to access the media at any one time. Other times it refers to a frame structure with MAC addresses inside. In wired networks, isolated-per-layer optimization techniques have been successfully and practically applied to improve network performance. However, applying per layer optimization techniques is of limited value in wireless networks due to openness of transmission media. Instead, cross-layer optimization techniques have gained widespread use in the wireless network design methodologies.

MAC protocol design within the data link layer is traditionally undertaken independently of the PHY layer. Design of the PHY layer in this case assumes that the PHY layer is incapable of detecting colliding packets and hence simultaneous transmissions always fail. In reality, multi-user detection (MUD), successive interference cancellation (SIC), and code division multiple access (CDMA) are examples of multiple packet reception (MPR) techniques wherein the PHY layer can detect more than one packet at a time. Hypothetically, detecting two packets at a time can double the throughput of a network. With MPR techniques, collisions are resolved in the PHY as opposed to the MAC layer and simultaneous transmissions are possible. While resolving collisions at the PHY layer can simplify MAC design, because the PHY can detect a number of simultaneous packet receptions, the MAC is still required to handle higher order collisions. This will remove the separation of MAC and PHY layers but allows for the enhancing of performance.

In practical networks, it is almost impossible to have a fully synchronized reception from physically separated clients. At the very least, an asynchrony by a fraction of a symbol-transmission duration is always expected due to different propagation delays. Therefore, MPR methods must detect multiple asynchronous transmissions. Asynchronous MPR methods are mostly complicated. Direct sequence-code division multiple access (DS-CDMA) is one of the simple asynchronous MPR methods. However, cross-layer design techniques relying on CDMA suffer from exhaustive code search overhead. One solution has been to assign codes to different packet types instead of different users to design a MAC algorithm for multi-hop ad-hoc networks. Unfortunately, the power control overhead associated with DS-CDMA reduces the practical value of the algorithm. Under some signal-to-interference-plus-noise ratio (SINR) and timing constraints, the use of a message-in-message (MIM) scheme enables concurrent transmissions. A shuffle algorithm has been proposed to centrally schedule transmissions by different interfering access points (APs). This algorithm takes into account the timing requirements of MIM and schedules transmissions from different APs to comply with that in a manner that enables successful simultaneous transmissions. Another algorithm which targets solving the collision problem in the PHY is ZigZag decoding. Utilizing an iterative algorithm, ZigZag decoding resolves two similar consecutive collisions. Although the algorithm does not require any central decision making unit, it requires the observation of multiple collisions between two packets before decoding such collided packets.

Other simple MPR techniques are those based on multiple-input multiple-output (MIMO) systems. Switching to higher frequencies increases the feasibility of having multiple antenna users. MIMO communications enhances the performance of a wireless communication system in a number of different ways. The available diversity gain with space-time codes (STCs) enhances the link quality and can be used to increase the data rate by means of using denser signal constellations. By spatial multiplexing, for example using vertical-Bell Laboratories layered space-time (V-BLAST), several parallel independent data streams can be sent simultaneously to increase the throughput. Beamforming concentrates the transmission energy in one direction in order to increase SNR and range. On the other hand, interference nulling prevents reception from certain directions and reduces the level of interference sensed from other transmissions.

Recently, MPR methods have been developed for MIMO systems. For example, transmit antennas are not required to be on a single node in order for V-BLAST receiver to work. Therefore, multiple streams of data coming from different sources can be separated at a multiple-antenna receiver. An MPR method based on STC has also been developed for two users with two transmit antennas. Independent space-time coded streams are separable at a multiple-antenna receiver by preserving some degree of diversity.

Prior designs of a MAC for WLANs without hidden terminals have been proposed. The MAC algorithm is the same as IEEE 802.11 with request-to-send and clear-to-send (RTS/CTS) signaling except that it has additional receiver address fields in CTS and acknowledgment (ACK) frames to grant permission for the transmission of more than one node at a time. The design assumes that all nodes are single-antenna nodes and a multiple-antenna AP utilizes a multi-user dimension (MUD) method to detect different data streams. However, the major drawback of the design is that it completely ignores the hidden terminal problem. More importantly, the MPR method cannot achieve good bit error rate (BER) performance and loses diversity as the number of streams to be decoded increases. When the MPR method has a high BER, long data packets will be dropped with a high probability because of the error. This degrades the throughput of the MPR system in comparison to traditional systems. The latter is due to the fact that the overhead is in the order of long data packets as opposed to short RTS packets wasted by collisions.

An important benefit of employing STC-based MPR is the providing of a high diversity order compared to other MIMO-MPR methods. An MPR-aware MAC for a WLAN has been developed based on slotted ALOHA net. The PHY layer design is a combination of spatial multiplexing and STC-based MPR. All nodes as well as the AP are two-antenna nodes. In this method, each packet is broken into two equal-length sections and sent through each antenna. The AP examines the received signal in order to find the number of simultaneously received packets. For single-packet receptions, V-BLAST is used. For double packet receptions, a retransmission follows and STC-based MPR is employed. While this MPR-aware MAC improves the performance in comparison to slotted ALOHA net, it yet again ignores the problem of hidden terminals and further assumes the nodes to be perfectly synchronized.

BRIEF SUMMARY OF THE INVENTION

In this disclosure, an asynchronous MPR method for the PHY and also design a compatible random access MAC for wireless local area networks (WLANs) is illustrated. Relying on space-time coding (STC) techniques, the disclosed MPR method detects multiple asynchronous packets while providing diversity and low bit error rates at the PHY layer. Extending the design of IEEE 802.11, the disclosed MPR MAC design encourages simultaneous packet transmissions and handles multiple packet receptions. Simulation results show that the throughput of a WLAN significantly improves in many scenarios of operation using the disclosed PHY/MAC MPR framework.

The illustrated embodiment is directed to a cross-layer PHY-MAC multi packet reception method based on the use of space-time coding techniques. Previously proposed MPR methods based on space-time coding (STC) were mainly designed for perfectly synchronized transmission scenarios and their performance was shown to be sensitive to transmission asynchrony. The illustrated embodiment is an STC-based MPR transmission and detection method that is tolerant to both time and frequency asynchrony. In asynchronous transmissions the disclosed method provides the same diversity gain as that associated with previously proposed synchronous methods. In support of the MPR-based PHY design, the MAC design is an extension of IEEE 802.11 with RTS/CTS signaling capable of operating in WLANs with hidden terminals. The MPR-aware MAC algorithm is operated by widening its acceptance duration in the receiving side in order to allow for accepting a larger number of double incoming RTS messages. There is a trade-off related to the choice of this widened acceptance duration. We observe that while an increased duration value increased the probability of collisions for more than two RTS messages, such increase also resulted in a greater chance of success for double transmissions. Simulation results consistently show a significant performance improvement compared to IEEE 802.11 standard with many scenarios exceeding 100% improvement in the synchronous case and in the asynchronous case approaching 95% improvement.

Besides focusing on the problem of designing an MPR-aware MAC algorithm for WLANs, we include scheduling policies for MPR-aware MAC algorithms maximizing the chance of having double- and multiple-collisions instead of avoiding them.

A new cross-layer MAC/PHY algorithm is disclosed which is capable of resolving the collision between two packets. The algorithm leverages a new PHY layer interference cancellation method for collision resolution. Further, we develop analytical models of characterizing the saturation throughput of a WLAN using our disclosed MPR MAC algorithm. Our analysis of the synchronous case considers the bit error probability of packet transmission in both single- and double-packet detection modes. The analysis also takes into account the channel coding rate and the resulting packet fragmentation overhead. The results illustrate significant enhancements in the throughput of a WLAN using our MPR method. Comparisons to another MPR method highlight the importance of the BER performance for both MPR methods. We note that it is possible for us to extend our MAC algorithm to the case of a larger number of simultaneous transmissions using conventional interference cancellation methods. Our MPR-MAC algorithm is extended to the case of ad-hoc and multi-hop networks. We also include addressing the cross-layer routing schemes utilizing MPR-MAC algorithm within the scope and spirit of the invention.

We further disclose a new cross-layer MAC/PHY algorithm which resolves the collision between two packets leveraging a novel interference cancellation method in the PHY layer. Then, we develop analytical models to characterize the saturation throughput of a WLAN using our multi-packet detector MAC algorithm. The analytical method takes into account the bit error probability of packet transmission in both single- and double-packet detection modes. The results illustrate significant enhancements in the throughput of a WLAN. Extension of our MAC algorithm to users with more than two antennas using the interference cancellation methods is within the scope of the invention. We extend our multi-packet detector MAC algorithm to ad-hoc and multi-hop networks.

In particular, the illustrated embodiments of the invention include a method for multi packet communication in an asynchronous wireless system comprising the steps of transmitting at least two packets of 2M digital signals denoted by symbols, $s_1, s_2, \ldots, s_{2M-1}, s_{2M}$, from a plurality of transmitters without other transmission taking place within a predetermined number of symbol durations from each side of each packet, wherein each transmitter generates digital signals denoted as at least two super-symbols, namely $S_1$ and $S_2$ according to an Alamouti coding scheme as:

$$S_1 = (s_1, s_2, \ldots, s_M)$$

$$S_2 = (s_{M+1}, s_{M+2} \ldots, s_{2M})$$

so that each transmitter transmits digital signals corresponding to M symbols of super-symbols $S_1$ and $S_2$ in a first transmission interval from a corresponding first and second antenna, respectively, and so that each transmitter transmits digital signals corresponding to M symbols of super-symbols $-S^*_2$ and $S^*_1$ in a second transmission interval from the first and the second antenna, respectively. The method continues with the step of receiving the packets of transmitted digital signals at a receiver wherein each received digital signal corresponding to a super-symbol causes inter-symbol interference with its nearest neighbors when imperfectly synchronized with respect to each other due to finite impulse response implementation of a pulse shaping filter in the receiver or sampling error of the received signals to expand the received packets. The method includes the step of generating a symmetric Alamouti structure for the received packets subject to inter-symbol interference by folding the received signal on itself and multiplying by a factor of −1, cancelling the interference with the Alamouti structure using multiple antenna at the receiver, and decoding the Alamouti structure for the received packets at each antenna of the receiver.

The step of transmitting at least two packets of 2M digital signals denoted by symbols, $s_1, s_2, \ldots, s_{2M-1}, s_{2M}$, from a plurality of transmitters without other transmission taking place within a predetermined number of symbol durations from each side of each packet comprises the step of transmitting according to the IEEE 802.11 standard to provide a guard interval around the packets.

The step of decoding using the Alamouti structure for the received packets at each antenna of the receiver comprises the steps of, in a case in which the packet which arrived second in time is to be decoded and where the inter-symbol interference from the packet which arrived first is to be canceled, first detecting the first arrived packet, measuring the time delay between the first and second arrived packets, and then reconstructing an extension sample using a measured time delay between the first and second arrived packets and channel coefficients.

The method further includes the step of using an MPR-aware MAC algorithm which increases the number of multiple packet transmissions by opening a waiting time window, $t_w$, at the receiver.

The method further includes the step of employing a modified IEEE 802.11 communication protocol between the receiver and the plurality of transmitters by expanding CTS/ACK frames of the communication protocol by a predetermined number of bytes for a redefined receiver address field in order to target two nodes, introducing a waiting time of $t_w$ at the receiver, where the predetermined number of time slots is a maximum tolerable time difference between the arriving RTS messages, all double RTS messages received by the receiver with a time difference less than $t_w$ being detected, and all double RTS messages received by the receiver with a larger time difference than $t_w$ being dropped, and increasing a timeout for the RTS packet by adding $t_w$ at the transmitter to a timeout duration of RTS messages in the communication protocol.

The step of increasing a timeout for the RTS packet by adding $t_w$ at the transmitter to a timeout duration of RTS messages in the communication protocol comprises the step of increasing a timeout for the RTS packet to a value of an extended interframe space of $RTStimeout_{MPR}=SIFS+CTS+DIFS+t_w$.

The method further includes the step of using a virtual channel sensing algorithm to encourage multiple transmissions by activating the virtual channel sensing algorithm upon the reception of two RTS messages in a node.

The illustrated embodiments of the invention also include a set of instructions recorded in a memory of a receiver and a plurality of memories corresponding respectively to a plurality of transmitters in a wireless local area network for controlling digital communication between the receiver and the plurality of transmitters according any one of the above embodiments of the method.

The illustrated embodiments of the invention also include an apparatus for performing the method of any one of the above embodiments.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

In this disclosure, an MPR method based on the use of STC is introduced. Along with providing a high diversity, the method detect transmissions with clock and frequency asynchrony. Being able to work with asynchronous packets reduces the synchronization signaling overhead in the network and also allows the MAC algorithm to properly handle the hidden terminal problem. The MPR-aware MAC algorithm introduced in this disclosure is designed for WLANs with and without hidden terminals. Each packet is vulnerable to collisions for a duration twice its length. Although RTS/CTS signaling is designed to combat the collision problem, the problem could still drastically lessen the throughput and significantly increase the delay of an IEEE 802.11 network. The MPR-aware MAC algorithm of this disclosure is designed to accommodate as many simultaneous transmissions as the maximum number of packets decodable by the PHY.

The innovations of this disclosure are three fold. First, it is apparent that all methods utilizing STC-based MPR have only been operational under near perfect synchronization assumptions. While other methods depending on BLAST-like MPR do not require symbol synchronization, they are characterized by high bit error rates when detecting multiple packets. This disclosure introduces the first asynchronous STC-based MPR framework that is capable of preserving diversity gain even when packets are asynchronous.

Second, none of the previously proposed MIMO-MPR cross-layer designs have considered the impact of hidden terminals. Unlike previous designs, the proposed design of this disclosure considers the issue of hidden terminals.

Figure 5:
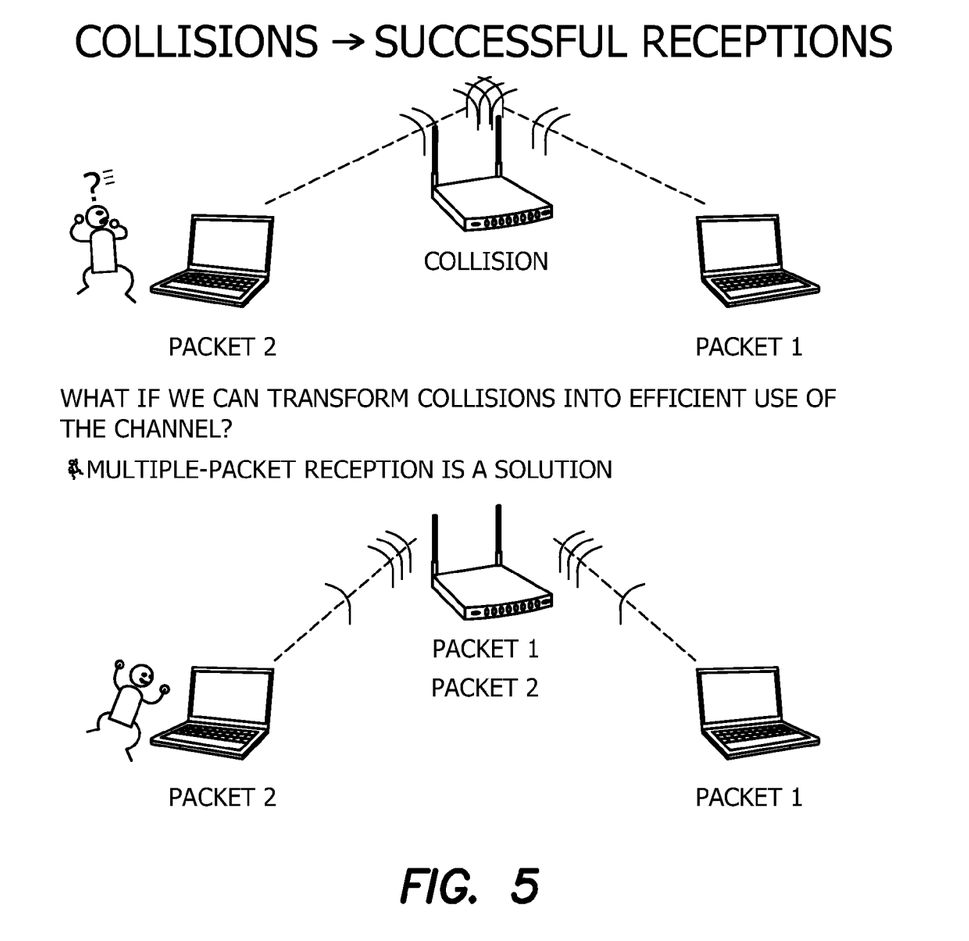
FIG. 5 is a diagram which illustratively poses the question of how packet collisions in a wireless local area network can be used to increase the efficiency of a channel and which illustratively suggests that the use of collisions of multiple packet reception could be employed as a solution to increase channel throughput.

Third, previous designs have ignored the fact that network throughput can be improved by increasing the number of multiple transmissions. Contrary to the previous design work, the illustrated design encourages a higher number of multiple packet transmissions and employs a new MAC design capable of improving network throughput as diagrammatically illustrated by FIG. 5.

We will first turn to the operation of the MPR method in the PHY layer. Then we will consider the disclosed MPR-aware MAC algorithm based on IEEE 802.11 standard.

Physical Layer Model

It is well understood that distributed nodes typically do not agree on their clock and central frequency. Exchanging time-stamped packets is one of the most practical synchronization methods for affine clocks. However, it is not possible to perfectly estimate all affine clock parameters even in a noise-free environment and there is always some level of deviation between such parameter estimations. Clock skews can be adjusted resulting in equal-length symbols, while clock offsets may vary. Furthermore, there is a frequency offset between the receiver and the transmitter that is typically estimated such that the associated effect can be canceled in the demodulation blocks. It is noted that some advanced synchronization techniques, such as timing advance in 3rd generation partnership project (3GPP) long term evolution (LTE), are able to compensate for the asynchrony of sources. However, such methods typically have an accuracy limitation preventing them from achieving exact synchronization between multiple packet receptions. In addition, the use of cyclic prefix (CP) within orthogonal frequency-division multiple access (OFDMA) symbols takes care of the remaining asynchrony for as long as the asynchrony between the two packets is less than the length of the CP.

In contrast, the illustrated embodiments focus on time domain solutions for systems such as random access WLANs. The latter systems are characterized by the fact that they have a low synchronization overhead, use non-OFDM modulation schemes, and impose no restriction on the asynchrony level between the two received packets. Since multiple packets reaching a receiver never agree on their time and frequency offsets, MPR methods need to handle detection of asynchronous packets. In what follows, we generalize the STC-based MPR methods for detecting asynchronous space-time coded packets.

Channel Model

In the illustrated embodiments, a quasi-static Rayleigh flat fading channel model is employed where channel coefficients are assumed to be constant during the transmission period of a packet. Channel coefficients are assumed to be independent and identically distributed complex Gaussian random variables. The channel coefficient from the transmitter's n-th antenna to the receiver's $m^{th}$ antenna is denoted by $\alpha_{n,m}$.

Let $C_n(t) = \Sigma_{l=1}^{L} s_n^l P(t-lT_s)$ be the transmitted signal from antenna n, where $s_n^l$ is the $l^{th}$ transmitted symbol and p(t) is the impulse response of the pulse shaping filter. Further, let $r_m(kT_s)$ be the received signal sampled at $t=kT_s$ at antenna m, where $T_s$ is the sampling interval and k is an integer. The samples of the received signal are expressed as:

$$r_m(kT_s) = \sum_{n=1}^{N} \alpha_{n,m} \sum_{l=1}^{L} s_n^l P(kT_s + \epsilon T_s - lT_s)e^{j2\pi k\delta fT_s} + \eta_{n,m} \qquad (1)$$

where sampling error $-\frac{1}{2} < \epsilon < \frac{1}{2}$ is a function of clock offsets as well as propagation delay between the transmitter and the receiver, P(t) is the impulse response of the pulse shaping filter after passing through the receiver filter, and $\delta f$ is the frequency difference between the transmitter and the receiver.

B. Time Synchronization

Imperfect sampling means that the receiver cannot correctly compensate for imperfections such as different clock offsets and propagation delays. Since an imperfect sampler samples P(t) at some time other than $kT_s$, not only is the k-th sample of the received signal $r_m(kT_s)$ a function of the k-th transmitted symbols $s_n^k$s, but also it is a function of the neighboring symbols, ..., $s_n^{k-2}$, $s_n^{k-1}$, $s_n^{k+1}$, $s_n^{k+2}$, .... This effect is called inter-symbol interference (ISI). Receivers should estimate the optimum sampling time and track it during decoding in order to eliminate the ISI effect.

Figure 1:
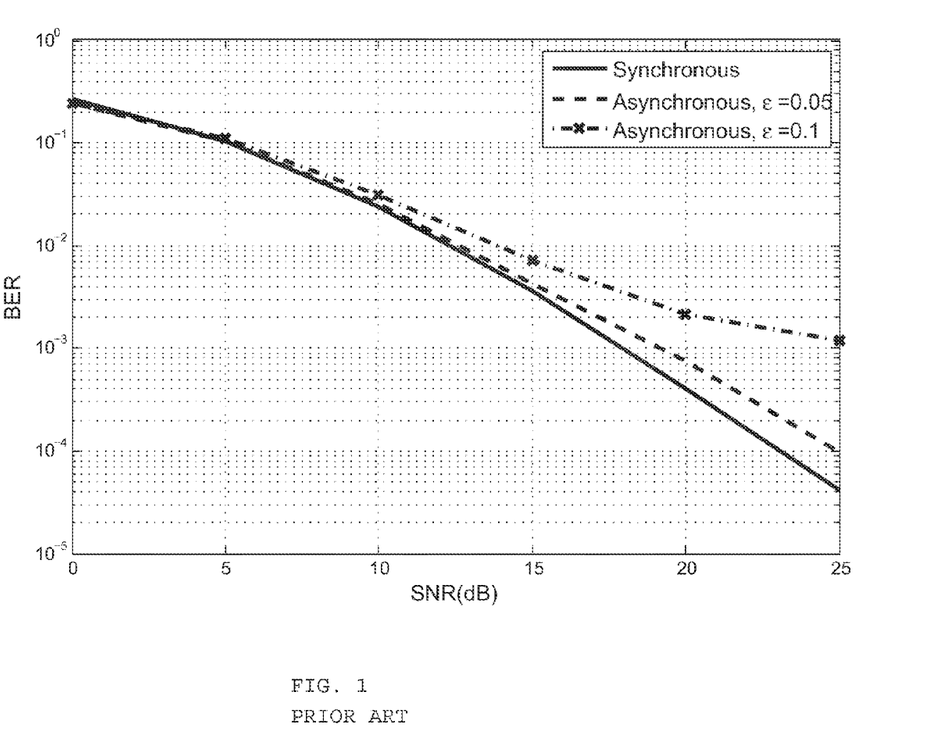
FIG. 1 is a graph of the signal to noise ratio, SNR, to the bit error rate, BER, for a prior art method using asynchronous transmission, a 2×2 link and quadrature phase shift keying (QPSK) modulation.

Consider a case in which a number of asynchronous terminals are simultaneously transmitting to a single receiver. Each transmitter has a unique clock offset and propagation delay with respect to the receiver. Even if the receiver is capable of sampling the received signal perfectly, sampling a superposition of asynchronous signals cannot be perfect for more than one of them. In this case, multi-user detection methods designed for synchronized transmitters may fail to perform as expected. For example, the array processing method loses diversity when transmitters are not synchronized. FIG. 1 is a graph which compares the BER performance of this method for synchronous and asynchronous cases utilizing two-antenna terminals. Note that in FIG. 1, even time differences as small as 5% of a symbol duration result in the loss of diversity. The loss of diversity gain is equal to a higher BER and, in turn, a higher packet error rate (PER). It is important to note that an MPR-aware MAC algorithm is more sensitive to the BER of the PHY compared to a standard MAC algorithm. For example, the time wasted due to a packet collision for standard IEEE 802.11 with RTS/CTS signaling is RTS+SIFS (short interframe space)+CTS, while the same collision leads to a time wastage of RTS+SIFS+CTS+SIFS+DATA+SIFS+ACK for an MPR method which is much longer. Thus, packet loss in MPR-aware networks can undesirably lower the throughput.

In what follows, we introduce a transmission scheme that provides the promised diversity even when transmitters are not synchronized. For the sake of discussion, let all terminals be two-antenna terminals. This method can be easily expanded to the case of terminals with more than two antennas. First, let us explain the details of an array processing technique to detect multiple symbol-synchronous transmissions. Terminals employ Alamouti coding to encode and transmit symbols $s_1$ and $s_2$ as below:

$$C = \begin{pmatrix} s_1 & s_2 \\ -s_2^* & s_1^* \end{pmatrix} \quad (2)$$

A two-antenna receiver can at most decode two simultaneous signals. Suppose Terminal j transmits $s_k(j)$. The received signal at the m-th antenna of the receiver can be written as:

$$\begin{pmatrix} R_{1,m} \\ R_{2,m}^* \end{pmatrix} = \begin{pmatrix} \alpha_{1,m}(1) & \alpha_{2,m}(1) \\ -\alpha_{2,m}^*(1) & \alpha_{1,m}^*(1) \end{pmatrix} \cdot \begin{pmatrix} s_1(1) \\ s_2(1) \end{pmatrix} + \quad (3)$$

$$\begin{pmatrix} \alpha_{1,m}(2) & \alpha_{2,m}(2) \\ -\alpha_{2,m}^*(2) & \alpha_{1,m}^*(2) \end{pmatrix} \cdot \begin{pmatrix} s_1(2) \\ s_2(2) \end{pmatrix} + \begin{pmatrix} \eta_{1,m} \\ \eta_{2,m}^* \end{pmatrix}$$

Let us denote the matrix multiplied by $(s_1(j)\ s_2(j))^T$ in Eq. (3) as $A_m(j)$. Then, $A_m(j)$ is a multiple of a unitary matrix. To cancel out the interference from Terminal 2, $R_m = (R_{1,m}\ R^*_{2,m})^T$ is multiplied by $A^H_m(2)$ and divided by $|A_m(2)|^2=|\alpha_{1,m}(2)|^2+|\alpha_{2,m}(2)|^2$, where $(.)^H$ is the Hermitian transpose of a matrix. Then subtracting the samples of the first antenna from those of the second antenna results in:

$$\frac{A_2^H(2)R_2}{|A_2(2)|^2} - \frac{A_1^H(2)R_1}{|A_1(2)|^2} = \quad (4)$$

$$\left(\frac{A_2^H(2)A_2(1)}{|A_2(2)|^2} - \frac{A_1^H(2)A_1(1)}{|A_1(2)|^2}\right)\begin{pmatrix} s_1(1) \\ s_2(1) \end{pmatrix} + \begin{pmatrix} n'_{1,m} \\ \eta'_{2,m} \end{pmatrix}$$

In Eq. (4), the matrix multiplied by the signal vector is a multiple of a unitary matrix, and decoding the data of the first terminal using Eq. (4) is straightforward. This array processing technique provides a diversity of degree 2 for each terminal.

Now, we present the disclosed transmission method of the illustrated embodiments that works after relaxing the synchronization assumption. To transmit a packet of 2M symbols, i.e., $s_1, s_2, \ldots, s_{2M-1}, s_{2M}$, each transmitter forms two super-symbols, namely $S_1$ and $S_2$ as:

$S_1=(s_1, s_2 \ldots, s_M)$ $S_2=(s_{M+1}, s_{M+2}, \ldots, s_{2M})$ \quad (5)

Figure 6:
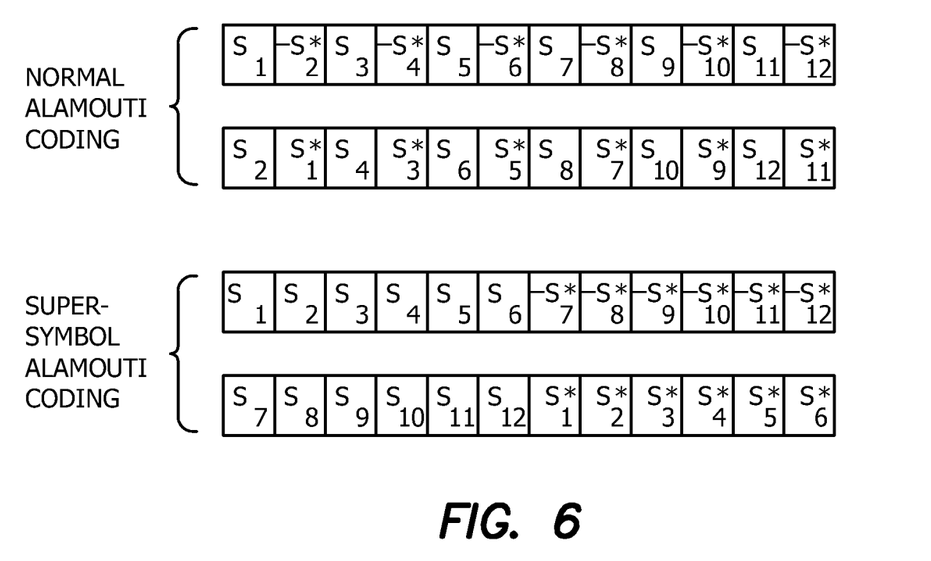
FIG. 6 provides a diagrammatic illustration comparing normal Alamouti coding of symbols $s_1$-$s_{12}$ and the super-symbol coding $S_1$ and $S_2$ of the same.

Then each terminal transmits according to the Alamouti coding scheme of Eq. (2) while replacing symbols $s_j$ with super-symbols $S_j$. The transmitter sends M symbols of super-symbols $S_1$ and $S_2$ in the first transmission interval from its first and second antenna, respectively. FIG. 6 provides a diagrammatic illustration comparing normal Alamouti coding of symbols $s_1$-$s_{12}$ and the super-symbol coding of the same.

Figure 2A:
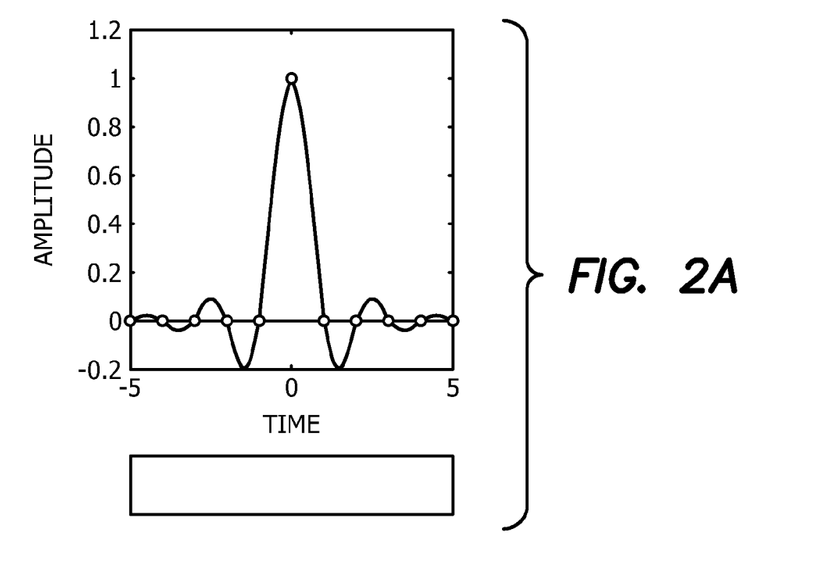
FIGS. 2a and 2b are graphs which show the effect of a perfect and imperfect sampling respectively.
Figure 2B:
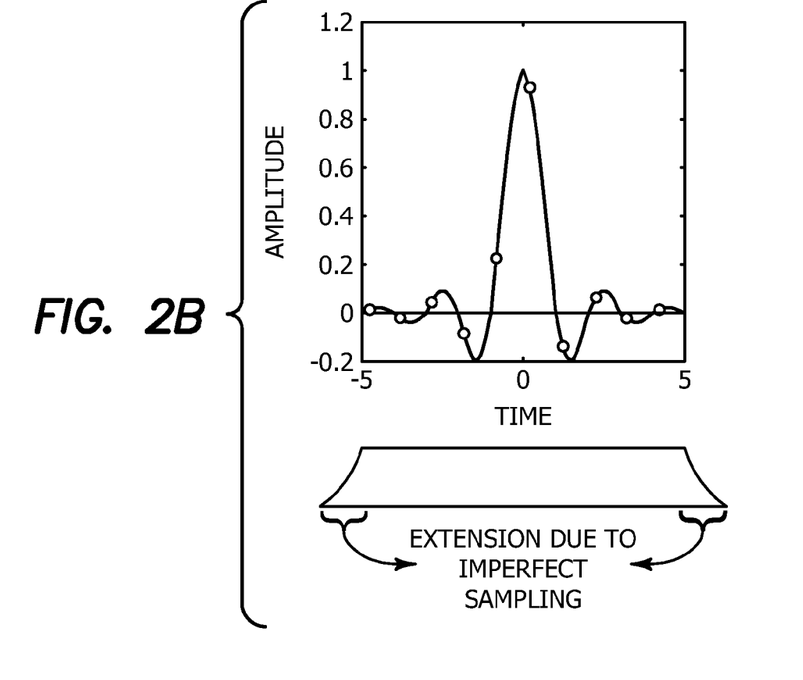
Figure 3:
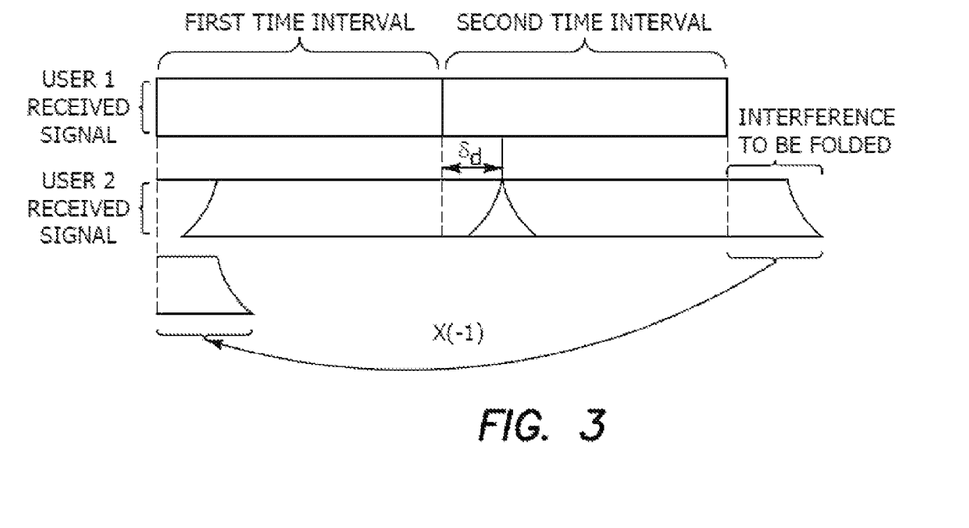
FIG. 3 is a diagram which illustrates noiseless received signals at the receiver and the interference folding process.

During the second transmission interval, the transmitter sends $-S^*_2$ and $S^*_1$ from the first and the second antenna, respectively. Due to finite impulse response (FIR) implementation of the pulse shaping filters, each symbol will cause ISI to its nearest neighbors in the case of imperfect synchronization. The effect of sampling error on the received signal is illustrated in FIGS. 2a and 2b. We note that perfect sampling as shown in FIG. 2(a), does not cause ISI while imperfect sampling as shown in FIG. 2(b) causes ISI and expands the received packet. As illustrated by FIG. 2b, an imperfectly sampled super-symbol is expanded at its two ends in comparison to a perfectly sampled super-symbol in FIG. 2a. Let us assume that because of the FIR pulse shaping filter and imperfect sampling, a super-symbol expands by I, for example I=5, symbols. If the transmitted super-symbol is the row vector $S_j$, the expanded super-symbol after imperfect sampling of $\epsilon$ is given by the following equation:

$$\tilde{S}_j = (0\ 0\ 0\ 0\ 0\ S_j\ 0\ 0\ 0\ 0\ 0) \times F^T \quad (6)$$

$$F = \begin{pmatrix} P_0 & P_{-1} & P_{-2} & \ldots & P_{-(L+2l)} \\ P_1 & P_0 & P_{-1} & \ldots & P_{-(L+2l-1)} \\ \vdots & & & \ddots & \\ P_{L+2l} & P_{L+2l-1} & P_{L+2l-2} & \ldots & P_0 \end{pmatrix}$$

where $P_k=P(\epsilon T_s+kT_s)$. Now, consider two terminals transmitting according to the above transmission scheme. The noiseless received signals from two transmitters arriving with a time difference of $\delta_d$ at the receiver are shown in FIG. 3. Without loss of generality, we assume that the signal of Terminal 1 is sampled perfectly and the signal of Terminal 2 is sampled with a sampling error of $\epsilon$.

FIG. 3 illustrates that when signals from different users reach a destination with a time delay, the interference is asymmetric over the two sections of the desired signal. FIG. 3 also depicts that the received signal is "folded" on itself and multiplied by a factor of −1 in order to generate the symmetric Alamouti structure for the interference. The following equations explain the folding process:

If d>l:

$S_1=(\tilde{S}_2*[M+l-d+1], \tilde{S}_2*[M+l-d+2], \ldots, \tilde{S}_2*[M], \tilde{S}_2*$
$\quad [M+1]+\tilde{S}_1[1], \ldots, \tilde{S}_2*[M+2l]+\tilde{S}_1[2l],$
$\quad \tilde{S}_1[2l+1], \ldots, \tilde{S}_1[M+2l-d])$ $S_2=(-\tilde{S}_1*[M+l-d+1], -\tilde{S}_1*[M+l-d+2], \ldots, -\tilde{S}_1*[M],$
$\quad -\tilde{S}_1*[M+1]+\tilde{S}_2[1], \ldots, -\tilde{S}_1*[M+2l]+\tilde{S}_2[2l],$
$\quad \tilde{S}_2[2l+1], \ldots, \tilde{S}_2[M+2l-d])$ If d≤l:

$S_1=(\tilde{S}_2*[M+l-d+1], \tilde{S}_1[l-d+1], \ldots, \tilde{S}_2*[M+2l]+\tilde{S}_1$
$\quad [2l], \tilde{S}_1[2l+1], \tilde{S}_1[2l+2], \ldots \tilde{S}_1[M], \tilde{S}_1[M]-\tilde{S}_2*$
$\quad [1], \ldots, \tilde{S}_1[M+l-d]-\tilde{S}_2*[l-d])$ $S_2=(\tilde{S}_2[l-d+1]-\tilde{S}_1*[M+l-d+1], \ldots, \tilde{S}_2[2l]-\tilde{S}_1*[M+$
$\quad 2l], \tilde{S}_2[2l+1], \tilde{S}_2[2l+2], \ldots, \tilde{S}_2[M], \tilde{S}_1*[1]+\tilde{S}_2$
$\quad [M], \ldots, \tilde{S}_1*[l-d]+\tilde{S}_2[M+l-d])$ Therefore, we have:

$$\begin{pmatrix} R_{1,m} \\ R_{2,m}^* \end{pmatrix} = \quad (7)$$

$$\begin{pmatrix} \alpha_{1,m}(1) & \alpha_{2,m}(1) \\ -\alpha_{2,m}^*(1) & \alpha_{1,m}^*(1) \end{pmatrix} \cdot \begin{pmatrix} S_1(1) \\ S_2(1) \end{pmatrix} + \begin{pmatrix} \alpha_{1,m}(2) & \alpha_{2,m}(2) \\ -\alpha_{2,m}^*(2) & \alpha_{1,m}^*(2) \end{pmatrix} \cdot \begin{pmatrix} S_1(2) \\ S_2(2) \end{pmatrix}$$

where A[k] describes the k-th element of vector A, and $S_i(j)$ is the ith super-symbol of User j. Note that $d=[\delta_d/T_s]$.

Eq. (7) is essentially the same as Eq. (3) from which multiuser detection was derived. In Eq. (7), the effect of having two time asynchronous transmissions is taken into account. Note that to cancel the interference from the second terminal, the receiver does not need to know the sampling error of the second terminal. As evident from Eq. (7), this is due to the fact that the imperfectly sampled interference signal has an Alamouti structure independent of the sampling error, $\epsilon$. It is given that the samples from the extension of super-symbols are available at the receiver. To this end, no other transmission should take place in a distance of I symbol durations from each side of the packet. The SIFS specified in IEEE 802.11 standard provides this guard interval around the packets. The SIFS specified in IEEE 802.11 standard is the time from the end of the last symbol of the previous frame to the beginning of the first symbol of the preamble of the subsequent frame as seen at the air interface. Therefore, the MPR method in PHY introduces no transmission time overhead. For a case in which the packet arrived second is to be decoded and the interference from the packet arrived earlier is to be canceled, the first few extension samples may not be available at the receiver. The solution is to first detect the earlier packet and then reconstruct the extension samples knowing the time delay between the two packets and channel coefficients.

Figure 4:
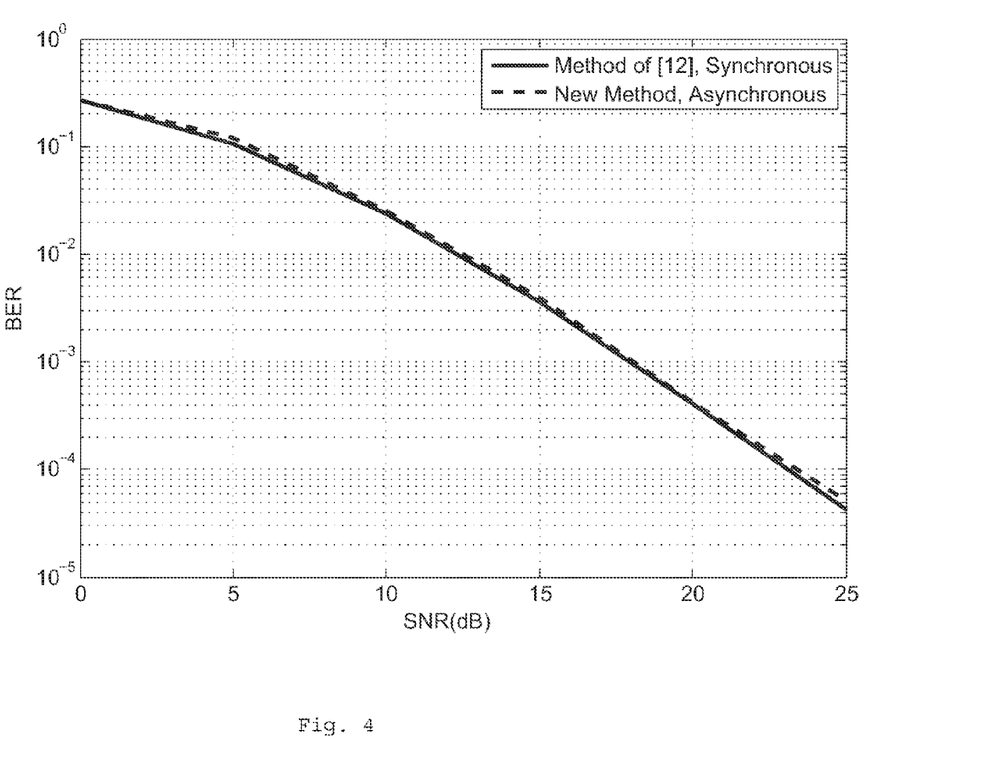
FIG. 4 is a graph of BER as a function of SNR of an average performance comparison of the MPR method of the illustrated embodiments with an asynchronous transmission compared to that of the method illustrated in FIG. 1 using a synchronous transmission.

FIG. 4 compares the BER performance of the disclosed asynchronous transmission method and that of the prior art synchronous array processing method of FIG. 1. In this figure, the synchronization error, $\epsilon$, is picked randomly and the average BER over a uniform distribution of $\epsilon$ is reported. From FIG. 4, it is clearly observed that the performance of the disclosed new asynchronous transmission method is very close to that of the synchronous method of FIG. 1 and provides a diversity order of 2.

C. Frequency Asynchrony

Having two physically separated radios at the exact same central frequency is practically impossible, and distributed radios always have different central frequencies. Hence, there is always a frequency offset $\delta f$ between the central frequencies of transmitting and receiving radios. This frequency offset introduces a cumulative phase shift to the samples of the received signal. Consider a simple system of two time synchronous single antenna terminals, with frequency offset $\delta f$. The k-th sample of the received signal would be:

$$r_k = \alpha_k s_k e^{j2\pi k \delta f T_s} + \eta_k \quad (8)$$

which translates to a linearly increasing phase shift over the samples of a packet. When there are several transmitters, the i-th terminal will have a frequency offset of $\delta f_i$. Taking into account the terminals' frequency offset, the folding process is modified and the phase difference of the folded part is compensated to re-create a continuous linearly increasing phase shift for the interference. Accordingly, Eq. (7) is modified to Eq. (9), $$\begin{pmatrix} R_{1,m}[k] \\ R_{2,m}[k] \end{pmatrix} = \begin{pmatrix} 1 & 0 \\ 0 & e^{(j2\pi\Delta_1)} \end{pmatrix} \begin{pmatrix} S_1(1)[k] & S_2(1)[k] \\ -S_2^*(1)[k] & S_1^*(1)[k] \end{pmatrix} \cdot \begin{pmatrix} \alpha_{1,m}(1)e^{(j2\pi\delta_1)} \\ \alpha_{2,m}(1)e^{(j2\pi\delta_1)} \end{pmatrix} + \begin{pmatrix} 1 & 0 \\ 0 & e^{(j2\pi\Delta_2)} \end{pmatrix} \begin{pmatrix} S_1(2)[k] & S_2(2)[k] \\ -S_2^*(2)[k] & S_1^*(2)[k] \end{pmatrix} \cdot \begin{pmatrix} \alpha_{1,m}(2)e^{(j2\pi\delta_2)} \\ \alpha_{2,m}(2)e^{(j2\pi\delta_2)} \end{pmatrix} \quad (9)$$

where $\Delta_i = M \delta f_i T_s$, $\delta_1 = k \delta f_1 T_s$ and $\delta_2 = (k-d-l) \delta f_2 T_s$.

a. Eq. (9) can be restructured, similar to Eq. (3), as:

$$\begin{pmatrix} R_{1,m}[k] \\ R_{2,m}^*[k] \end{pmatrix} = \Omega_{1,m}^k \begin{pmatrix} S_1(1)[k] \\ S_2(1)[k] \end{pmatrix} + \Omega_{2,m}^k \begin{pmatrix} S_1(2)[k] \\ S_2(2)[k] \end{pmatrix} + \begin{pmatrix} \eta'_{1,m} \\ \eta'^*_{2,m} \end{pmatrix} \quad (10)$$

where $$\Omega_{i,m}^k = \begin{pmatrix} 1 & 0 \\ 0 & e^{(j2\pi\Delta_i)} \end{pmatrix} A_m^k(i) \quad (11)$$

$$A_m^k(i) = \begin{pmatrix} \alpha_{1,m}(i)e^{(j2\pi\delta_i)} & \alpha_{2,m}(i)e^{(j2\pi\delta_i)} \\ \alpha_{2,m}^*(i)e^{(-j2\pi\delta_i)} & -\alpha_{1,m}^*(i)e^{(-j2\pi\delta_i)} \end{pmatrix}$$

$\Omega_{i,m}^k$ is a multiple of a unitary matrix so that $\Omega_{i,m}^{kH} \Omega_{i,m}^k = A_m^{kH}(i)$ $A_m^k(i) = (|\alpha_{1,m}(i)|^2 + |\alpha_{2,m}(i)|^2) I = |\Omega_{i,m}^k|^2 I$.

The next step is to cancel the interference from Terminal 2 to decode the data of Terminal 1. Similar to what was done for Eq. (4), we multiply each vector $R_m[k] = (R_{1,m}[k] R^*_{2,m}[k])^T$ with $\Omega^{kH}_{2,m}$, divide it by $|\Omega^k_{2,m}|^2$, and subtract the result for m=1 from that of m=2. Eq. (12), captures the results.

$$\frac{\Omega_{2,2}^{kH} R_2^k}{|\Omega_{2,2}^k|^2} - \frac{\Omega_{2,1}^{kH} R_1^k}{|\Omega_{2,1}^k|^2} = \left( \frac{\Omega_{2,2}^{kH} \Omega_{1,2}^k}{|\Omega_{2,2}^k|^2} - \frac{\Omega_{2,1}^{kH} \Omega_{1,1}^k}{|\Omega_{2,1}^k|^2} \right) \begin{pmatrix} S_1(1)[k] \\ S_2(1)[k] \end{pmatrix} + \begin{pmatrix} \eta'_{1,m} \\ \eta'^*_{2,m} \end{pmatrix}$$

In Eq. (12) the matrix at the left side of the signal vector is a multiple of a unitary matrix. To prove this fact, it is enough to show that $\Omega^{kH}_{2,m} \Omega^k_{1,m}$ is a unitary matrix. This is true due to the following:

$$(\Omega_{2,m}^{kH} \Omega_{1,m}^k)^H (\Omega_{2,m}^{kH} \Omega_{1,m}^k) = A_m^{kH}(1) \begin{pmatrix} 1 & 0 \\ 0 & e^{(j2\pi(\Delta_2 - \Delta_1))} \end{pmatrix} \quad (13)$$

$$A_m^k(2) A_m^{kH}(2) \begin{pmatrix} 1 & 0 \\ 0 & e^{(-j2\pi(\Delta_2 - \Delta_1))} \end{pmatrix} A_m^k(1)$$

$$= |\Omega_{2,m}^k|^2 A_m^{kH}(1) \begin{pmatrix} 1 & 0 \\ 0 & e^{(j2\pi(\Delta_2 - \Delta_1))} \end{pmatrix}$$

$$\begin{pmatrix} 1 & 0 \\ 0 & e^{(-j2\pi(\Delta_2 - \Delta_1))} \end{pmatrix} A_m^k(1)$$

$$= |\Omega_{2,m}^k|^2 A_m^{kH}(1) A_m^k(1)$$

$$= |\Omega_{2,m}^k|^2 |\Omega_{1,m}^k|^2 I$$

Knowing that this matrix is a multiple of a unitary matrix, one can readily decode the data of Terminal 1 from Eq. (12).

D. Implementation Issues

Consider now some of the implementation issues. First, we have assumed a perfect knowledge of channel coefficients, a perfect estimate of the delay, and a perfect estimate of the frequency offset between the two packets. There are algorithms to estimate all of the aforementioned parameters, but such algorithms obviously produce inaccurate results as the SNR of the received signal decreases. The gap between the theory and practice always affects the performance of implemented systems, and the implementation of the MPR algorithm is subject to the same effect. To implement the disclosed proposed MPR PHY, algorithms can be devised to enhance the accuracy of estimations. From the implementation standpoint, we note that the disclosed interference cancellation scheme does not require adding any major subsystem to the current transmission/reception modules of a system using Alamouti codes. At the transmitter, the coding block can be easily modified to accept super-symbols instead of standard symbols. A typical decoder has all required modules for estimating channel coefficients, frequency offsets, and sampling offsets. We need to estimate the delay between the two received signals. The latter quantity can be estimated using a correlator module that correlates the received signal to the known preamble. An IEEE 802.11 receiver already has a correlator module. A simple threshold processing of the output of this correlator can provide the time offset between the two packets. Further, the folding process only needs to access the memory and perform additions.

The elements of the $A^k_m(i)$ and $\Omega^k_{i,m}$ matrices in Eq. (11) can be calculated by feeding channel coefficient estimates to a derotator module. Finally, the interference cancellation scheme of Eq. (12) requires complex conjugations, complex multiplications, and real divisions. After performing interference cancellation, an array processing operation similar to that of the Alamouti decoder is required in order to detect the transmitted data from the interference free signal. No matrix inversion is required for this part and the only needed operations are complex addition and complex multiplication.

MAC Algorithm

Note that the use of MPR aware MAC design methodologies does not affect the existing trade space of deterministic versus random access MAC algorithms. In fact, MPR-aware MAC design is affected by the characteristics of the utilized MAC algorithm. While scheduled designs require a central scheduler and signaling overhead to keep all nodes synchronized, random access methods have little signaling overhead at the cost of stimulating undesired collision effects. Thus, upgrading scheduled MAC algorithms such as TDMA, FDMA, and OFDMA to handle MPR is straightforward. The requirement is to assign one resource, i.e. time slot, or frequency band to more than one user. This process can be optimized by assigning resources to users based on their channel condition, QoS requirements, and the like. Examples of such algorithms are conventional and can be found in LTE MU-MIMO and WiMAX collaborative MIMO.

Contrary to the case of deterministic MAC algorithms, incorporating MPR-awareness into the functionality of random access MAC algorithms, such as carrier sense multiple access (CSMA), is not straightforward due to the randomness characterizing the access to channel resources. We have designed a CSMA-based-MPR-aware MAC by making minimal essential modifications to the MAC algorithm of the IEEE 802.11 standard.

Note that the goal is to design a practical and backward compatible MPR-aware random access MAC without addressing any of the existing optimization trades. It is well known that the throughput performance of CSMA deteriorates rapidly as the network load increases. While modifications such as adding RTS/CTS signals and back off mechanisms attempt at avoiding collisions and limiting bandwidth and time wastage, the resulting performance still vanishes as the number of nodes in the network increases and collisions dominate the performance.

In the case of two-antenna nodes and two-antenna APs, an AP can only detect two simultaneous transmissions. Receiving more than two simultaneous packets is treated as a collision. Therefore, the MPR-aware MAC must allow for as many double simultaneous information exchange scenarios as possible and prevent higher than double transmission (collision) scenarios. MPR-aware MAC algorithms usually try to convert double collisions to multiple packet transmissions in a recovery operation. Further, such algorithms are usually designed for networks without hidden terminals.

In the illustrated embodiment, we introduce an MPR-aware MAC algorithm which increases the number of multiple packet transmissions by opening a waiting time window at the receiver and which also works for networks with hidden terminals. The latter is done by setting the parameter $t_w$ as discussed below.

In the IEEE 802.11 standard, RTS messages are used by a transmitter to inform its target receiver of its intention to send data. A receiver responds with a CTS message if it is ready to receive that data. In the disclosed MPR-aware MAC, RTS and CTS messages have the same functionality. In WLANs, all terminals communicate with the AP. Therefore, all multi-packets received at the PHY of the AP can be decoded and are therefore forwarded to higher layers. When the AP receives multiple-packets, it has to be able to inform all corresponding transmitters that their packets have been received successfully. In the RTS/CTS handshake, the AP confirms the reception of packets twice, once via a CTS message when the RTS packet is received and once via an ACK message when the data packet is received. The same applies to the disclosed proposed MPR-aware MAC. Therefore, CTS/ACK frames are expanded by 6 bytes for the new receiver address field, in order to target two nodes.

We introduce a waiting time of $t_w$ at the receiver, which is the maximum tolerable time difference between the arriving RTS messages. In other words, when a receiver detects the beginning of an RTS packet, it opens a window of size $t_w$ and searches for the beginning of any other RTS messages received in that time window. All double RTS messages reaching the receiver with a time difference less than $t_w$ can be detected, and those with a larger time difference will be dropped, i.e., collision. On the other end, the transmitter increases the timeout for the RTS packet by adding $t_w$ to the timeout duration of RTS messages in IEEE 802.11. While packet timeouts are not specified in IEEE 802.11 standard, a value of the extended interframe space, $EIFS_{802.11}=SIFS+CTS+DIFS$ is usually used for RTS packets. Therefore, $RTStimeout_{MPR}=EIFS_{802.11}+t_w$.

In IEEE 802.11, a virtual channel sensing algorithm is used that forces nodes to hear an RTS message and to set their network access vectors (NAV) timer to avoid collision with the ongoing transmission. In the disclosed MPR-aware MAC and for the purpose of encouraging multiple transmissions, the reception of two RTS messages in a node activates the virtual channel sensing process as opposed to setting up the NAV table, which is the result of receiving a single RTS message. We also note that the existence or lack of hidden terminals in a WLAN does not impact the algorithm in one way or another.

It is important to note that the only overhead introduced by the disclosed MPR-aware MAC algorithm is the extra receiver address field in the CTS and ACK messages, the waiting time at the AP, and the corresponding increase in the timeout value of RTS packets. In heavily loaded networks, this overhead is easily compensated for by multiple packet transmissions.

The AP can detect all pairs of RTS packets which are at most $t_w$ seconds apart. Hence, by increasing $t_w$, the receiver has a better chance of detecting two packets simultaneously in turn allowing more packets to transit within the network and increasing network throughput.

When two RTS packets are detected at the AP, a CTS packet will ask the corresponding transmitters to send their data packets. Both terminals receive the CTS packet at approximately the same time with a variation caused by the propagation delay. To facilitate synchronization at the AP, the terminals will send their data packets with different delays. The terminal whose address appears first in the CTS waits for SIFS and transmits its data packet. The other terminal will send its data packet after two SIFS. Therefore, the MPR overhead is mainly related to transmitting RTS packets.

A packet drop in any of the signaling phases is regarded as a failed transmission and the corresponding transmitters go through with the retransmission process as they would do in IEEE 802.11. This includes the cases in which the CTS/ACK message is sent for two transmitters, but only one of them receives the CTS/ACK packet correctly, i.e, the loss is due to bit errors.

It is worth noting that the above MAC algorithm can be used with any MPR method capable of detecting asynchronous packets such as successive interference cancelled (SIC). The MPR method introduced above provides diversity and has a lower BER in comparison to other MPR methods consuming the same amount of power. To detect long data packets successfully, the detection method must support a sufficiently low BER, or else the MPR method may decrease network throughput.

Consider briefly deterministic MAC algorithms. We note that in deterministic algorithms such as those used by LTE and WiMAX, there is no collision to resolve, but controlled MPR opportunities as users are assigned by a central AP to a specific time-slot and/or frequency band. The saturation throughput improvement for these scenarios is roughly equal to $2[(1-PER_{MPR})/(1-PER)]$, where $PER_{MPR}$ is the packet error rate for the MPR and PER is the packet error rate for the normal operation mode. While the MAC algorithm is independent of the MPR technique employed at the PHY layer, MAC scheduling might be affected by the MPR technique's performance in terms of error probability. Characteristics of the MPR aware MAC algorithm of the illustrated embodiments is summarized in the table below.

| Important issues addressed | Solution |
|---|---|
| Permission for more than one packet at a time | Add new address fields to CTS/ACK packets |
| Waiting for the next RTS packet to come | Increase the timeout of RTS packets |
| Encouraging more double packet transmissions | Do not set the NAV table for one RTS packet |
| How long is the waiting time for the second RTS packet to come? | Analysis and simulation |

In summary in the illustrated embodiments, we disclosed a cross-layer PHY-MAC MPR method based on the use of space-time coding techniques. Previously proposed MPR methods based on space-time coding were mainly designed for perfectly synchronized transmission scenarios and their performance was shown to be sensitive to transmission asynchrony. We proposed an STC based MPR transmission and detection method that is tolerant to both time and frequency asynchrony. We showed that in asynchronous transmissions the disclosed proposed method provides the same diversity gain as that associated with previously proposed synchronous methods. Although we have presented the disclosed scheme for users with two transmit antennas, in general orthogonal STBCs and quasi-orthogonal STBCs can be used for more than two antennas. Similarly, the proposed interference cancellation method can be extended to more than two users with more than two antennas. For example, If J users, communicate with an N antenna receiver, use of a conventional array processing technique provides each user with a receive diversity of $N-J+1$. The prior art scheme was designed to detect synchronous packets. However, designing an asynchronous scheme based on the ideas presented in this disclosure is enabled.

In support of the MPR-based PHY design, we also described the disclosed MAC design as an extension of IEEE 802.11 with RTS/CTS signaling capable of operating in WLANs with and without hidden terminals. The disclosed MPR-aware MAC algorithm operated by widening its acceptance duration in the receiving side in order to allow for accepting a larger number of double incoming RTS messages. The MAC algorithm can be readily generalized to support reception of more than two simultaneous packets. We studied the trade-off related to the choice of this widened acceptance duration. We observed that while the use of a longer waiting time increased the probability of collisions for more than two RTS messages, such increase in the waiting time duration also resulted in a greater chance of success for double transmissions. Simulation results consistently showed a significant performance improvement compared to the baseline of IEEE 802.11 standard. Besides focusing on the problem of designing an MPR-aware MAC algorithm for ad-hoc networks, the disclosed future work considers studying new scheduling policies for MPR-aware MAC algorithms maximizing the chance of having double- and multiple-collisions instead of avoiding them. Furthermore, MPR-aware MAC can be potentially used to solve hidden AP problems in networks with dominant downlink traffic.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method for multi packet communication in an asynchronous wireless system having an open systems interconnection (OSI) model comprising:

transmitting at least two packets of 2M digital signals denoted by symbols, $s_1, s_2, \ldots, s_{2M-1}, s_{2M}$, from a plurality of transmitters without other transmission taking place within a predetermined number of symbol durations from each side of each packet by transmitting at least two packets to provide a guard interval around the at least two packets, wherein each transmitter generates digital signals denoted as at least two super-symbols, namely $S_1$ and $S_2$ according to an Alamouti coding scheme as:

$S_1 = (s_1, s_2, \ldots, s_M)$ $S_2 = (s_{M+1}, s_{M+2}, \ldots, s_{2M})$ so that each transmitter transmits digital signals corresponding to M symbols of super-symbols $S_1$ and $S_2$ in a first transmission interval from a corresponding first and second antenna, respectively, and so that each transmitter transmits digital signals corresponding to M symbols of super-symbols $-S^*_2$ and $S^*_1$ in a second transmission interval from the first and the second antenna, respectively;

asynchronously receiving the packets of transmitted digital signals at a receiver which synchronizes with one of the packets, and where the received digital symbols in the corresponding super symbol of the other one of the at least two packets causes inter-symbol interference a finite number of its nearest neighbors among the received digital symbols in the corresponding super symbol due to finite impulse response implementation of a pulse shaping filter and sampling error at the receiver;

generating a symmetric Alamouti structure for the asynchronously received packets subject to inter-symbol interference by folding the asynchronously received signal on itself and multiplying by a factor of −1;

canceling the inter-symbol interference in the asynchronously received packets to generate a remaining signal; and decoding the symmetric Alamouti structure for the remaining signal.

2. The method of claim 1 having an open systems interconnection (OSI) model with at least two antenna nodes and at least two-antenna access points (APs) further comprising:

receiving multiple simultaneous packets at the at least two APs by opening a waiting time window, $t_w$, at a corresponding receiver, which waiting time window, $t_w$, is a maximum tolerable time difference between the arriving request to send (RTS) messages;

expanding corresponding clear to send/acknowledgement frame (CTS/ACK) frames by a plurality of bytes for corresponding receiver address fields to target the at least two antenna nodes, so that when the receiver detects a beginning of an RTS packet, the receiver opens a window of size $t_w$ and searches for a beginning of any other RTS messages received in that time window, where all double RTS messages reaching the receiver with a time difference less than $t_w$ are detected, and those with a larger time difference are dropped as a collision;

increasing a timeout for the RTS packet at a corresponding transmitter by adding $t_w$ to a timeout duration of RTS messages so that RTStimeout$_{multiple\ provider\ router\ (MPR)}$=Extended Interframe Space (EIFS)$_{802.11}$+$t_w$; and activating a virtual channel sensing process on reception of at least two RTS messages in the at least two antenna nodes to encourage multiple transmissions.

3. The method of claim 2 where decoding the symmetric Alamouti structure for the received packets at each antenna of the receiver comprises, in a case in which the packet which arrived second in time is to be decoded and where the inter-symbol interference from the packet which arrived first is to be canceled, first detecting the first arrived packet, measuring the time delay between the first and second arrived packets, and then reconstructing an extension sample using a measured time delay between the first and second arrived packets and channel coefficients.

4. A set of instructions recorded on a non-transitory computer readable medium of a receiver and a plurality of non-transitory computer readable media corresponding respectively to a plurality of transmitters in a wireless local area network for controlling digital communication between the receiver and the plurality of transmitters according to the method of claim 2.

5. The method of claim 3 where increasing a timeout for the RTS packet by adding $t_w$ at the transmitter to a timeout duration of RTS messages in the communication protocol comprises increasing a timeout for the RTS packet to a value of an extended interframe space of RTStimeout$_{MPR}$=short interframe space (SIFS)+CTS+distributed interframe space (DIFS)+$t_w$.

6. The method of claim 5 further comprising using a virtual channel sensing algorithm to encourage multiple transmissions by activating the virtual channel sensing algorithm upon the reception of two RTS messages in a node.

7. A method for multi packet communication in an asynchronous wireless system with at least two-antenna nodes and at least two-antenna access points (APs) comprising:

receiving multiple simultaneous packets at a target two-antenna receiver through the two-antenna AP by opening a waiting time window, $t_w$, at the receiver, which waiting time window, $t_w$, is a maximum tolerable time difference between the arriving request to send (RTS) messages;

expanding corresponding clear to send/acknowledgement frame (CTS/ACK) packets by a plurality of bytes for corresponding receiver address fields to target the at least two antenna nodes, such that when the receiver detects a beginning of an RTS packet, the receiver opens a window of size $t_w$ and searches for a beginning of any other RTS messages received in that time window, where all double RTS messages reaching the receiver with a time difference less than $t_w$ are detected, and those with a larger time difference are dropped as a collision;

increasing a timeout for the RTS packet at a corresponding transmitter by adding $t_w$ to a timeout duration of RTS messages so that RTStimeout$_{multiple\ provider\ router\ (MPR)}$=Extended Interframe Space (EIFS)$_{802.11}$+$t_w$; and activating a virtual channel sensing process on reception of at least two RTS messages in the at least two antenna nodes to encourage multiple transmissions.

8. An apparatus for multi packet communication in an asynchronous wireless system comprising:

a plurality of transmitters with each transmitter having at least two antennas for transmitting at least two packets of 2M digital signals denoted by symbols, $s_1, s_2, \ldots, s_{2M-1}, s_{2M}$, without other transmission taking place within a predetermined number of symbol durations from each side of each packet by transmitting at least two packets to provide a guard interval around the at least two packets, wherein each transmitter generates digital signals denoted as at least two super-symbols, namely $S_1$ and $S_2$ according to an Alamouti coding scheme as:

$$S_1=(s_1, s_2, \ldots, s_M)$$

$$S_2=(s_{M+1}, s_{M+2}, \ldots, s_{2M})$$

so that each transmitter transmits digital signals corresponding to M symbols of super-symbols $S_1$ and $S_2$ in a first transmission interval from a corresponding first and second antenna, respectively, and so that each transmitter transmits digital signals corresponding to M symbols of super-symbols $-S^*_2$ and $S^*_1$ in a second transmission interval from the first and the second antenna, respectively;

a receiver for receiving the packets of transmitted digital signals wherein each received digital signal corresponding to a super-symbol causes inter-symbol interference with finite number of its nearest neighbors when imperfectly sampled due to finite impulse response implementation of a pulse shaping and sampling error at the receiver and expands the received packets;

where the receiver includes a digital processing circuit for generating a symmetric Alamouti structure for the received packets subject to inter-symbol interference by folding the received signal on itself and multiplying by a factor of −1; and decoding the Alamouti structure for the received packets at each antenna of the receiver.

9. The apparatus of claim 8 where the digital processing circuit for decoding the Alamouti structure for the received packets at each antenna of the receiver comprises, in a case in which the packet which arrived second in time is to be decoded and where the inter-symbol interference from the packet which arrived first is to be canceled, digital processing circuitry for first detecting the first arrived packet, measuring the time delay between the first and second arrived packets, and then reconstructing an extension sample using a measured time delay between the first and second arrived packets and channel coefficients.

10. The apparatus of claim 8 where the digital processing circuit further comprises digital processing circuitry using an multiple provider router (MPR)-aware medium access control (MAC) algorithm which increases the number of multiple packet transmissions by opening a waiting time window, $t_w$, at the receiver.

11. A set of instructions recorded on a non-transitory computer readable medium of a receiver and a plurality of non-transitory computer readable media corresponding respectively to a plurality of transmitters in a wireless local area network for controlling digital communication between the receiver and the plurality of transmitters in the apparatus of claim 8.

12. The apparatus of claim 10 where the digital processing circuit further comprises digital processing circuitry employing a modified IEEE 802.11 communication protocol between the receiver and the plurality of transmitters by expanding clear to send/acknowledgement frame (CTS/ACK) frames of the communication protocol by a predetermined number of bytes for a redefined receiver address field in order to target two nodes, introducing a waiting time of $t_w$ at the receiver, where the predetermined number of time slots is a maximum tolerable time difference between the arriving request to send (RTS) messages, all double RTS messages received by the receiver with a time difference less than $t_w$ being detected, and all double RTS messages received by the receiver with a larger time difference than $t_w$ being dropped, and increasing a timeout for the RTS packet by adding $t_w$ at the transmitter to a timeout duration of RTS messages in the communication protocol.

13. The apparatus of claim 12 where the digital processing circuit further comprises digital processing circuitry for increasing a timeout for the RTS packet by adding $t_w$ at the transmitter to a timeout duration of RTS messages in the communication protocol comprises increasing a timeout for the RTS packet to a value of an extended timeout of RTStimeout$_{MPR}$=short interframe space (SIFS)+CTS+distributed interframe space (DIFS)+$t_w$.

14. The apparatus of claim 13 where the digital processing circuit further comprises digital processing circuitry for using a virtual channel sensing algorithm to encourage multiple transmissions by activating the virtual channel sensing algorithm upon the reception of two RTS messages in a node.

* * * * *